United States Patent Office 3,491,076
Patented Jan. 20, 1970

3,491,076
ACCELERATED SEALANT COMPOSITION
Gustave Bryant Bachman, West Lafayette, Ind., assignor to Broadview Chemical Corporation, a corporation of Illinois
No Drawing. Filed Aug. 8, 1967, Ser. No. 659,021
Int. Cl. C08f 3/62
U.S. Cl. 260—88.5     24 Claims

ABSTRACT OF THE DISCLOSURE

A sealant composition for bonding closely facing metal surfaces, including a room-temperature-curing vinyl monomer such as an acrylic acid ester of polyethyleneglycol, tetrahydrofurfuryl alcohol, cyclohexanol, dimethylaminoethanol or the like, a peroxidic catalyst such as 1% of t-butyl hydroperoxide, and rhodanine or an organic hydrazide as accelerator such as 0.3% ethyl carbazate or 0.4% N-aminorhodanine. Said sealant may also contain an organic imide such as 0.3% phthalimide and/or a stable organic amine such as 0.03% ethoxyethoxyethoxypropylamine.

BACKGROUND OF THE INVENTION

Field of the invention

This invention relates to accelerating the cure of room temperature sealants containing liquid monomer-catalyst mixtures which are shelf stable but capable of setting up at room temperature on confinement between closely facing metal surfaces to cause the surfaces to adhere to each other.

Description of the prior art and cross-references to related applications

Shelf stable metal sealant compositions have been formulated for the purpose of bonding closely facing metal surfaces, e.g., threaded joints, in a full range of varying strengths, viscosities, thixotropies and curing or setting rates. Such sealant compositions usually include a room-temperature-reactive acrylic monomer which is capable of being cured at room temperature within the desired period of time. For example, the acrylic monomer may be an acrylic diester of an ethylene glycol, e.g., a polyethylene glycol as described by L. W. Kalinowski in United States Patent No. 3,249,656 entitled "Sealant Composition," issued May 3, 1966; an acrylic ester of a cyclic ether alcohol as described by J. R. Stapleton in application Ser. No. 517,321, now abandoned, entitled "Adhesive Composition for Metals and the Like," filed Dec. 29, 1965; an acrylic ester of an amino alcohol such as described in C. Rai's copending application Ser. No. 561,381, now abandoned, entitled "Metal Sealant Containing Amino Acrylic Ester," filed June 29, 1966, and/or mixtures of the above with each other or with other polymerizable monomers such as allylic monomers. The disclosures of monomers and the specific examples of such monomers described in the above identified patent applications are hereby incorporated in this application by reference as examples of sealant compositions which are useful in the practice of the present invention as set out herein. The room-temperature-reactive monomers are used in an amount sufficient to create a firm seal when the catalyzed mixture is confined between closely facing metal surfaces and allowed to cure at room temperature. The catalysts for sealant compositions with which the present invention is concerned are usually peroxidic catalysts.

A number of accelerators have already been suggested for use in such sealant compositions. However, many of these accelerators either render the sealant unstable on storage or do not accelerate cure in very short periods and the sealants often require two hours or longer to reach a finger-tight state of cure.

SUMMARY OF THE INVENTION

Briefly the present invention involves the use of rhodanine and organic hydrazides as accelerators for shelf stable sealant compositions containing a room-temperature-reactive monomer and a catalyst system for catalyzing the cure of polymerization of the monomer at room temperature. The sealant composition is useful in bonding closely facing metal surfaces. It is particularly useful where a fast rate of room temperature cure and high ultimate strength are desired, but it still retains shelf stability in the absence of the metal surfaces.

DESCRIPTION OF THE PREFERRED EMBODIMENTS

The useful accelerators of this invention are rhodanine and the organic hydrazides which are soluble in effective amounts in the monomer of the sealant composition. Even very small amounts are effective so the solubility can be very slight, e.g., as little as 0.001 weight percent or less. The organic hydrazides are those compounds having the following structure:

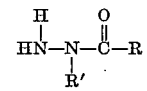

wherein R is selected from the class consisting of hydrogen, alkyl, cycloalkyl, aryl, and alkoxy and R' is selected from the class consisting of hydrogen, alkyl, cycloalkyl, acyl, and dithiocarbonyl

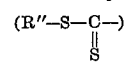

The groups R and R' may be connected to each other directly or indirectly through other atoms or groups to form a ring system, as in

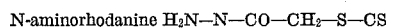

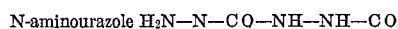

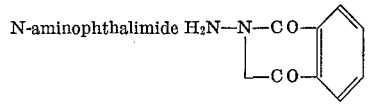

and the like. Thus, R and R' can constitute the ring structure of a cyclic amide such as the ring structure of rhodanine, glyoxalylurea, mesoxalylurea, alloxanic acid, pryrazolone, phenazone, etc. As further examples, R and R' can be separately selected from hydrogen and the $C_1$ to $C_{20}$ or higher aliphatic alkyl or cycloakyl groups, including the unsaturated aliphatic forms such as alkenyl, alkdienyl, alkenylcycloalkyl, and the like, e.g. methyl, heptenyl, isoctyl, hexadecenyl, dodecadienyl, eicosyl, cyclohexyl, ethylcyclohexyl, propenylcyclohexyl, etc. As still other examples, R can be aryl or alkoxy such as benzyl, anthracyl, benzylethyl, ethoxy, hexoxy, cyclohexoxy, heptadecoxy, methoxypropyl, ethoxyethoxyethoxy, ethoxyethoxyethoxybutyl, etc.; also, R' can be acyl or dithiocarbonyl, including formyl, propionyl, acrylyl, oleyl, and the dithiocarbonyl groups of the formula

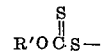

wherein R" denotes a hydrocarbon group. The natures of the R, R' and R" groups appear unimportant so long as they are inert chemically in the uncured polymerization system under storage conditions and do not confer undesirable physical properties such as insolubility in the sealant composition.

In one preferred form of the present invention, stable organic amine accelerators such as those disclosed in the copending application of C. Rai, Ser. No. 558,595, can be included in the sealant composition together with the hydrazide and/or rhodanine. The disclosure of said C. Rai application is incorporated herein by reference for support of such amines. Briefly, the amines are oxyalkyl amines including methoxyethylamine, hydroxypropylamine, ethoxyethoxyethoxypropyl amine, and many others.

In another preferred form of the present invention an organic imide accelerator can be included as a co-accelerator with the accelerators of this invention either in the presence or absence of amine accelerators. The organic imide accelerators are those compounds which include in their structure at least one of the groups:

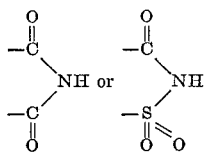

These include such organic imides of polycarboxylic acids as succinimide, phthalimide, maleimide, malonimide, citrimide, cyclohexyldicarboximide, N-butyl maleimide and the sulfimides such as benzoic sulfimide. The amine co-accelerators or imide co-accelerators can be used in very small amounts from as low as 0.001 percent or less up to 5 percent or more.

To prepare the present sealant compositions, it is merely necessary to mix a suitable amount of the hydrazide and/or rhodanine compound, co-accelerators (where used) and peroxide catalyst with the selected reactive monomer or mixture of monomers. Metal containers should not be used because of the chance of premature polymerization. It has been found that the peroxide catalyst, e.g., organic peroxide, including organic hydroperoxides and peresters, or hydrogen peroxide, can be used, e.g. in amounts of 0.05 to 10 or 20% or more, preferably 0.5 to 8%, and usually 0.5 to 3% in the sealant composition. The amount of hydrazide and/or rhodanine accelerators may vary from 0.001 to 10 or more weight percent and an optimum can usually be found between 0.01 and 3 weight percent depending on the monomer system and peroxide catalyst used. The preferred amount of accelerator is 0.05 to 2%.

The amount of hydrazide and/or rhodanine should be effective to promote the polymerization, e.g., 0.001 or less to 20 or more weight percent. It has been found that increasing the amount of the hydrazide or rhodanine often further increases the rate of promotion of polymerization, and this is especially true when amounts up to 5% by weight are used. Additional hydrazide or rhodanine above this amount can be used as desired without departing from the spirit of this invention since an excess of the accelerator does not normally adversely affect stability in an uncontrollable manner. However, so much of the accelerator should not be used that it will dilute the sealant monomer to an extent which would prevent the sealant from polymerizing to a solid state.

Examples of suitable organic peroxides are cumene hydroperoxide, t-butyl hydroperoxide, methylethylketone hydroperoxide, tetralin hydroperoxide, di t-butyl peroxide, t-butyl peracetate, di t-butyl diperphthalate, and the like.

Inhibitors or stabilizers can be added as needed to balance or prevent instability of the sealant. Hydroquinone and its ethers, such as p-methoxyphenol are preferred inhibitors and stabilizers because of their availability and effectiveness to inhibit until it is desired to set up sealant composition between the closely facing metal surfaces in the absence or air. Hydroquinone, or an ether thereof, in a total amount of 25 to 1000 p.p.m., more usually 50 to 400 p.p.m., will probably be sufficient to stabilize most sealant compositions containing the ester. Other conventional inhibitors or stabilizers for inhibiting polymerization of vinyl compounds can be used as will be apparent to those in the art.

It is intended that other polymerizable unsaturated compounds including esters, hydrocarbons and ethers, as well as plasticizers such as diisodecyl phthalate or the monobutyl ether of ethylene glycol, may be included in the present sealant compositions to modify the properties of the compositions.

Preferred sealant compositions may also contain a minor amount, e.g. up to 50% of a soluble polymer or prepolymer, e.g. a low molecular weight polymer of an allyl ester of an aromatic polycarboxylic acid, hereinafter referred to as allylic prepolymer, which is preferably copolymerizable with the principal monomer. Such a composition may be conveniently prepared by premixing the principal monomer and the prepolymer to provide a generally homogeneous mixture preferably prior to addition of catalyst and accelerator. A prepolymer having desirable characteristics is diallyl phthalate which can be obtained under the name "Dapon 35" from Food Machinery Corporation, having the following reported physical properties:

Bulk density, lbs./cu. ft. _____ 14–16
Sp. gr. at 25° C. _____ 1.267
Iodine No. 57.
Softening range, ° C. _____ 85–115

The compositions of this invention are useful in adhering closely facing surfaces, usually metal, to each other. Close contact of the sealant composition with the metal surfaces apparently results in initiating the cure of the monomer by the catalyst and accelerator.

The following examples are offered for the purpose of illustration and are not intended as limiting the invention. As illustrative examples, Examples 1 through 65 were prepared by mixing the amounts reported as parts by weight (p.b.w.), of ingredients identified in Table I for each example. The key to ingredient identity is as follows:

| Designation in Table I | Identity by Chemical Composition |
|---|---|
| Accelerator A | Ethyl carbazate, $H_2NNHCOOC_2H_5$ |
| Accelerator B | t-Butyl carbazate, $H_2NNHCOOC_4H_9$ |
| Accelerator C | Rhodanine, $NHCOCH_2SC{=}S$ |
| Accelerator D | N-amino rhodanine, $H_2NNCOCH_2SC{=}S$ |
| Catalyst E | t-Butyl hydroperoxide. |
| Catalyst F | d-t-Butyl diperphthalate. |
| Catalyst G | t-Butyl peroxymaleic acid. |
| Catalyst H | Bis (1-hydroxycyclohexyl) peroxide. |
| Catalyst I | Cumene hydroperoxide. |
| Co-accelerator J | Ethoxyethoxyethoxypropylamine. |
| Co-accelerator K | Phthalimide. |
| Co-accelerator L | Succinimide. |
| Co-accelerator M | Formamide. |
| Co-accelerator N | Saccharin. |
| Monomer P | Polyethyleneglycol dimethacrylate. |
| Monomer Q | Tetrahydrofurfuryl methacrylate. |
| Monomer R | Trimethylolpropane trimethacrylate. |
| Prepolymer S | Dapon 35. |

TABLE I—Ingredients, Parts by Weight

| Example | Monomer and Prepolymer | Accelerator | Catalyst and Co-accelerator |
|---|---|---|---|
| 1 | 100 p.b.w. P | 0.05 p.b.w. A | 0.1 p.b.w. E. |
| 2 | 100 p.b.w. P | 0.1 p.b.w. A | 0.1 p.b.w. E. |
| 3 | 100 p.b.w. P | 0.1 p.b.w. A | 0.5 p.b.w. E. |
| 4 | 100 p.b.w. P | 0.5 p.b.w. A | 0.5 p.b.w. E. |
| 5 | 100 p.b.w. P | 0.1 p.b.w. A | 1.0 p.b.w. E. |
| 6 | 100 p.b.w. P | 1.0 p.b.w. A | 1.5 p.b.w. E. |
| 7 | 100 p.b.w. P | 0.5 p.b.w. A | 0.05 p.b.w. J. / 0.5 p.b.w. E. |
| 8 | 100 p.b.w. P | 0.1 p.b.w. A | 0.3 p.b.w. N. / 0.1 p.b.w. E. |
| 9 | 100 p.b.w. P | 0.1 p.b.w. A | 0.3 p.b.w. N. / 0.5 p.b.w. E. |
| 10 | 100 p.b.w. P | 0.1 p.b.w. A | 0.3 p.b.w. N. / 1.0 p.b.w. E. |
| 11 | 100 p.b.w. P | 0.1 p.b.w. A | 0.3 p.b.w. K. / 0.5 p.b.w. E. |
| 12 | 100 p.b.w. P | 0.1 p.b.w. A | 0.05 p.b.w. J. / 0.3 p.b.w. N. / 0.1 p.b.w. E. |
| 13 | 100 p.b.w. P | 0.1 p.b.w. A | 1.0 p.b.w. E. |

TABLE I—Continued

| Example | Monomer and Prepolymer | Accelerator | Catalyst and Co-accelerator |
|---|---|---|---|
| 14 | 100 p.b.w. P | 0.75 p.b.w. B | 0.1 p.b.w. E |
| 15 | 100 p.b.w. P | 0.1 p.b.w. B | 0.5 p.b.w. E |
| 16 | 100 p.b.w. P | 0.5 p.b.w. B | 0.5 p.b.w. E |
| 17 | 100 p.b.w. P | 0.5 p.b.w. B | 1.5 p.b.w. E |
| 18 | 100 p.b.w. P | 0.1 p.b.w. B | 0.3 p.b.w. M. / 0.5 p.b.w. E. |
| 19 | 100 p.b.w. P | 0.1 p.b.w. B | 0.3 p.b.w. N. / 0.5 p.b.w. E. |
| 20 | 100 p.b.w. P | 0.1 p.b.w. C | 1.0 p.b.w. E |
| 21 | 100 p.b.w. P | 0.1 p.b.w. D | 0.5 p.b.w. E |
| 22 | 100 p.b.w. P | 0.1 p.b.w. D | 1.0 p.b.w. E |
| 23 | 100 p.b.w. P | 0.1 p.b.w. D | 1.5 p.b.w. E |
| 24 | 100 p.b.w. P | 0.3 p.b.w. D | 1.0 p.b.w. E |
| 25 | 100 p.b.w. P | 0.1 p.b.w. D | 0.3 p.b.w. M. / 0.5 p.b.w. E. |
| 26 | 100 p.b.w. P | 0.1 p.b.w. D | 0.05 p.b.w. J. / 0.3 p.b.w. N. / 0.5 p.b.w. E. |
| 27 [1] | 100 p.b.w. P | 0.1 p.b.w. C | 2.0 p.b.w. I |
| 28 | 100 p.b.w. P | 0.1 p.b.w. B | 0.5 p.b.w. E |
| 29 | 100 p.b.w. P | 0.5 p.b.w. B | 0.5 p.b.w. E |
| 30 | 100 p.b.w. P | 0.75 p.b.w. B | 0.5 p.b.w. E |
| 31 | 100 p.b.w. P | 1.0 p.b.w. B | 0.5 p.b.w. E |
| 32 | 100 p.b.w. P | 0.1 p.b.w. B | .05 p.b.w. J. / 0.5 p.b.w. E. |
| 33 | 100 p.b.w. P | 0.5 p.b.w. B | .05 p.b.w. J. / 0.5 p.b.w. E. |
| 34 | 100 p.b.w. P | 0.75 p.b.w. B | 0.5 p.b.w. J. / 0.5 p.b.w. E. |
| 35 | 100 p.b.w. P | 1.0 p.b.w. B | 0.5 p.b.w. J. / 0.5 p.b.w. E. |
| 36 | 100 p.b.w. P | 0.5 p.b.w. B | .05 p.b.w. J. / 1.0 p.b.w. E. |
| 37 | 100 p.b.w. P | 1.0 p.b.w. B | .05 p.b.w. J. / 1.0 p.b.w. E. |
| 38 | 100 p.b.w. P | 0.1 p.b.w. C | 0.3 p.b.w. N. / 0.5 p.b.w. E. |
| 39 | 100 p.b.w. P | 0.1 p.b.w. C | 0.3 p.b.w. N. / .05 p.b.w. J. / 0.5 p.b.w. E. |
| 40 | 100 p.b.w. P | 0.1 p.b.w. C | 1.0 p.b.w. E |
| 41 | 100 p.b.w. P | 0.1 p.b.w. C | 0.3 p.b.w. N. / 1.0 p.b.w. E. |
| 42 | 100 p.b.w. P | 0.3 p.b.w. C | 1.0 p.b.w. E |
| 43 | 100 p.b.w. P / 100 p.b.w. S | 0.1 p.b.w. A | 1.0 p.b.w. E. / 0.3 p.b.w. J. / 0.3 p.b.w. N. |
| 44 | 100 p.b.w. P / 100 p.b.w. S | 0.1 p.b.w. B | 0.5 p.b.w. E. / 0.3 p.b.w. J. / 0.3 p.b.w. N. |
| 45 | 100 p.b.w. P / 100 p.b.w. S | 0.1 p.b.w. D | 0.5 p.b.w. E. / 0.3 p.b.w. J. / 0.3 p.b.w. N. |
| 46 | 100 p.b.w. P | 0.5 p.b.w. B | 0.5 p.b.w. E |
| 47 | 100 p.b.w. P | 0.75 p.b.w. B | 0.5 p.b.w. E. / 0.05 p.b.w. J. |
| 48 | 100 p.b.w. P | 1.0 p.b.w. B | 0.5 p.b.w. E. / 0.05 p.b.w. J. |
| 49 | 100 p.b.w. P | 0.5 p.b.w. B | 1.0 p.b.w. E. / 0.05 p.b.w. J. |
| 50 | 100 p.b.w. P | 1.0 p.b.w. B | 1.0 p.b.w. E. / 0.05 p.b.w. J. |
| 51 | 100 p.b.w. P | 0.5 p.b.w. B | 1.5 p.b.w. E. / 1.5 p.b.w. E. |
| 52 | 100 p.b.w. P | 0.5 p.b.w. B | 1.5 p.b.w. J. / 0.05 p.b.w. J. |
| 53 | 100 p.b.w. P | 1.0 p.b.w. B | 1.5 p.b.w. E / 0.05 p.b.w. J. |
| 54 | 100 p.b.w. P | 0.1 p.b.w. A | 0.5 p.b.w. F |
| 55 | 100 p.b.w. P | 0.1 p.b.w. A | 1.5 p.b.w. F |
| 56 | 100 p.b.w. P | 0.1 p.b.w. B | 1.5 p.b.w. F |
| 57 | 100 p.b.w. P | 0.1 p.b.w. C | 1.5 p.b.w. F |
| 58 | 100 p.b.w. P | 0.1 p.b.w. D | 1.5 p.b.w. F |
| 59 | 100 p.b.w. P | 0.1 p.b.w. C | 1.5 p.b.w. G |
| 60 | 100 p.b.w. P | 0.1 p.b.w. D | 1.5 p.b.w. G |
| 61 | 100 p.b.w. P | 0.1 p.b.w. C | 0.5 p.b.w. G |
| 62 | 100 p.b.w. P | 0.1 p.b.w. D | 0.5 p.b.w. G |
| 63 | 100 p.b.w. P | 0.3 p.b.w. A | 3.0 p.b.w. F |
| 64 | 100 p.b.w. P | 0.3 p.b.w. A | 3.0 p.b.w. F. / 0.3 p.b.w. N. |
| 65 | 100 p.b.w. P | 0.3 p.b.w. A / 0.3 p.b.w. C | 3.0 p.b.w. H |
| 66 | 100 p.b.w. Q | 0.3 p.b.w. A | 1.0 p.b.w. E |
| 67 | 100 p.b.w. Q | 0.3 p.b.w. B | 1.0 p.b.w. F |
| 68 | 100 p.b.w. Q | 0.3 p.b.w. C | 1.0 p.b.w. E |
| 69 | 100 p.b.w. Q | 0.3 p.b.w. D | 1.0 p.b.w. F |
| 70 | 70 p.b.w. Q / 30 p.b.w. R | 0.3 p.b.w. A | 1.0 p.b.w. E |
| 71 | 70 p.b.w. Q / 30 p.b.w. R | 0.3 p.b.w. B | 1.0 p.b.w. F |
| 72 | 70 p.b.w. Q / 30 p.b.w. R | 0.3 p.b.w. C | 1.0 p.b.w. E |
| 73 | 70 p.b.w. Q / 30 p.b.w. R | 0.3 p.b.w. D | 1.0 p.b.w. F |
| 74 | 100 p.b.w. Q | 0.3 p.b.w. A | 1.0 p.b.w. E. / 0.5 p.b.w. L. |
| 75 | 100 p.b.w. Q | 0.3 p.b.w. B | 1.0 p.b.w. E. / 0.5 p.b.w. M. |
| 76 | 100 p.b.w. R | 0.3 p.b.w. C | 1.0 p.b.w. F. / 0.3 p.b.w. N. |

[1] Each example also contained 0.01 part by weight hydroquinone.

The formulations of Examples 1 through 65 were subjected to a "finger-tight" locking test. Accordingly, three small drops of each formulation were dispensed on the exposed threads of a separate degreased 3/8–24, 1 inch medium carbon steel cap screw on each of which a degreased medium carbon steel nut had been threaded up close to the cap screw head. The nut was then backed off until it was within the area of threads to which the formulation had been applied. The cap screw was then placed head down on a level surface and allowed to stand. At various times the cap screws were checked and found to be "finger-tight," i.e. the nut could not be manually turned relative to the cap screw without the aid of a wrench or other tool. The times to "finger-tight" are reported in Table II.

Accelerated shelf life or stability tests were also conducted on samples of Examples 1–65 in order to determine the storage stability of representative compositions. In accordance with the test procedure, each composition, in its polyethylene bottle, was aged in an oven maintained at about 81° to 82° C. The samples are checked every 30 minutes for the first couple or hours and then are checked every hour or two until the samples gel or the test is discontinued. The test survival time is taken as the latest check at which the samples were not gelled. The test is an accelerated aging test and, as a correlation of the test procedure with actual storage conditions, a sealant composition free from gelling after 30 minutes under the aging conditions of the test will also be free from gelling under ambient or room temperature for at least one year. The times for survival of the stability test are reported in Table II, a plus (+) indicating that the test was discontinued at the indicated time and the sample had not yet gelled.

Additional cap screws were prepared as above for the examples for the purpose of testing the strength of the bonds between the nuts and cap screws after 24 hours. After expiration of the time interval, the head of the appropriate cap screw was held in a vise with the shank of the cap screw disposed vertically. A torque wrench was applied to the nut, and the torque required to dislodge the nut was noted. The results, reported in Table II, are an average of three to five tests.

TABLE II

| Example | "Finger Tight" Test, Minutes | 24-Hour Torque Test, in. lb. | Stability Test |
|---|---|---|---|
| 1 | 35 | 120 | 9 hrs. +. |
| 2 | 18 | 161 | 24 hrs. +. |
| 3 | 15 | 194 | 9 hrs. +. |
| 4 | 8 | 227 | 9 hrs. +. |
| 5 | 7 | 220 | 24 hrs. +. |
| 6 | 8 | 189 | 9 hrs. +. |
| 7 | 7 | 248 | 24 hrs. +. |
| 8 | <5 | 301 | 23 hrs. +. |
| 9 | 6 | 306 | 24 hrs. +. |
| 10 | 6 | 304 | 23 hrs. +. |
| 11 | 9 | 267 | 24 hrs. +. |
| 12 | 7 | 280 | 24 h's. +. |
| 13 | <5 | 302 | 24 hrs. +. |
| 14 | 13 | 282 | 24 hrs. +. |
| 15 | 9 | 220 | 23 hrs. +. |
| 16 | 6 | 314 | 24 hrs. +. |
| 17 | <5 | 330 | 24 hrs. |
| 18 | 10 | 268 | 23 hrs. |
| 19 | 9 | 318 | 23 hrs. |
| 20 | 15 | 230 | 4 hrs. |
| 21 | 19 | 190 | <15 hrs. |
| 22 | 15 | 166 | <15 hrs. |
| 23 | 14 | 183 | <15 hrs. |
| 24 | 14 | 156 | <4 hrs. |
| 25 | 15 | 228 | 24 hrs. |
| 26 | <5 | 246 | 24 hrs. |
| 27 | 10 | 249 | <4 hrs. |
| 28 | 11 | 248 | 24 hrs. +. |
| 29 | 6 | 314 | 24 hrs. +. |
| 30 | 6 | 264 | 24 hrs. +. |
| 31 | 5 | 277 | 24 hrs. +. |
| 32 | 9 | 220 | 24 hrs. +. |
| 33 | <5 | 273 | 24 hrs. +. |
| 34 | <5 | 315 | 24 hrs. +. |
| 35 | <5 | 316 | 24 hrs. +. |
| 36 | <5 | 302 | 24 hrs. +. |
| 37 | <5 | 320 | 24 hrs. +. |
| 38 | 13 | 240 | 4 hrs. |
| 39 | 15 | 267 | 2 hrs. |
| 40 | 15 | 230 | 2½ hrs. |
| 41 | 11 | 235 | 2 hrs. |
| 42 | 14 | 230 | 1 hr. |
| 43 | 10 | 342 | 150 min. |
| 44 | 20 | 298 | 150 min. |
| 45 | 15 | 346 | 8 hrs. +. |
| 46 | 6 | 314 | 24 hrs. |

TABLE II—Continued

| Example | "Finger Tight" Test, Minutes | 24-Hour Torque Test, in. lb. | Stability Test |
|---|---|---|---|
| 47 | <5 | 315 | 24 hrs. |
| 48 | <5 | 316 | 24 hrs. |
| 49 | <5 | 302 | 24 hrs. |
| 50 | <5 | 320 | 24 hrs. |
| 51 | <5 | 330 | 24 hrs. |
| 52 | <5 | 304 | 24 hrs. |
| 53 | <5 | 304 | 24 hrs. |
| 54 | 40 | 114 | 8 hrs. +. |
| 55 | 20 | 152 | 8 hrs. +. |
| 56 | 25 | 152 | 8 hrs. +. |
| 57 | 25 | 290 | 8 hrs. +. |
| 58 | 25 | 106 | 8 hrs. +. |
| 59 | 50 | 240 | 8 hrs. +. |
| 60 | 30 | 110 | 8 hrs. +. |
| 61 | 50 | 220 | 8 hrs. +. |
| 62 | 50 | 54 | 8 hrs. +. |
| 63 | <20 | 216 | 5 hrs. |
| 64 | <20 | 309 | 5 hrs. |
| 65 | <20 | 185 | 30 min. |

As still further examples of useful formulations, other hydrazide compounds as described generally above are substituted for the accelerators in any of the above examples with similar results. Thus, the examples of the invention encompass, but are not limited to, the use of all accelerators listed hereinabove.

As additional examples of suitable formulations, the above examples are repeated except that the monomer or monomers are replaced with polyethylene glycol diacrylate, tetrahydrofurfuryl chloracrylate, dimethylaminoethyl methacrylate, butylaminoethyl methacrylate, or other room temperature curing acrylic monomers or mixtures of such monomers. The hydrazide compounds have an accelerating effect on each such sealant formulation.

As examples of the variety of useful monomers, the following formulations were prepared and tested with the results reported:

| | Ingredients, Parts by Weight [1] | | |
|---|---|---|---|
| Example | Monomer | Accelerator | Catalyst and Co-accelerator |
| 77 | 100 p.b.w. Q | 0.1 p.b.w. D | 1.0 p.b.w. E. / 0.3 p.b.w. N. |
| 78 | 100 p.b.w. P | 0.1 p.b.w. D | 1.5 p.b.w. I. |
| 79 | 100 p.b.w. R | 0.1 p.b.w. A | 1.0 p.b.w. E. / 0.3 p.b.w. N. |
| 80 | 100 p.b.w. R | 0.1 p.b.w. B | 1.0 p.b.w. E. |
| 81 | 100 p.b.w. butyl amino ethyl methacrylate. | 0.1 p.b.w. B | 1.0 p.b.w. E. |

| Example | "Finger Tight" Test, Minutes | 24-Hour Torque Test, in. lb. | Stability Test |
|---|---|---|---|
| 77 | 15 | 228 | 5 hrs. |
| 78 | 20 | 180 | 60 min. |
| 79 | 30 | 259 | 5 hrs. |
| 80 | 70 | 194 | 5 hrs. |
| 81 | 70 | 106 | 5 hrs. |

[1] Each example also contained 0.01 part by weight hydroquinone.

The sealant compositions of this invention can be used to bond similar or dissimilar metal surfaces. The surfaces are usually ferrous metal surfaces, although the compositions are useful in bonding such other metals as brass, copper and tin. Zinc and cadmium, used as corrosion-resistant coatings on other metals, are less active metals and may require the use of a primer to activate the metal before applying the sealant. Suitable such primers are available commercially.

Many advantages of the present sealant composition have been discussed above; briefly, there is provided a sealant composition which is shelf stable for an extended period of time but which sets up very rapidly when closely contacted or confined between metal surfaces. This happens even on very inactive surfaces such as zinc or cadmium even without first priming such inactive surfaces with cobalt napthenate or like primers. The sealant compositions are receptive of and compatible with a variety of additional agents, including a full range of plasticizers, e.g., esters of phthalic acid, waxy plasticizers, etc., thixotroping agents such as a silica gel, e.g. Cab-O-Sil, and a variety of other monomers and soluble polymers.

For purpose of comparison with the compositions of this invention, the following compositions were prepared and tested with results reported below:

| | Ingredients, Parts by Weight [1] | |
|---|---|---|
| Composition | Monomer | Catalyst and Accelerator |
| C-1 | 100 p.b.w. P | 0.5 p.b.w. E. |
| C-2 | 100 p.b.w. P | 1.0 p.b.w. E. |
| C-3 | 100 p.b.w. P | 1.5 p.b.w. E. |
| C-4 | 100 p.b.w. P | 0.5 p.b.w. E. / 0.3 p.b.w. N. |
| C-5 | 100 p.b.w. P | 0.5 p.b.w. E. / 0.3 p.b.w. N. / 0.05 p.b.w. J. |
| C-6 | 100 p.b.w. P | 1.5 p.b.w. E. / 0.3 p.b.w. N. / 0.05 p.b.w. J. |

| Composition | "Finger-Tight" Test, Minutes | 24-Hour Torque Test, in. lb. | Stability Test |
|---|---|---|---|
| C-1 | [2] 240+ | 141 | 9 hrs. |
| C-2 | [2] 240+ | 192 | 5 hrs. |
| C-3 | [2] 240+ | 242 | 5 hrs. |
| C-4 | 60 | 192 | 9 hrs. |
| C-5 | 80 | 264 | 9 hrs. |
| C-6 | 120 | 243 | 60 min. |

[1] Each example also contained 0.01 part by weight hydroquinone.
[2] Not finger-tight after 240 minutes.

All percentages and parts given herein are percentages and parts by weight unless otherwise indicated.

The foregoing detailed description is given for clearness of understanding only and no unnecessary limitations are to be understood therefrom, as some modifications will be obvious to those skilled in the art.

I claim:
1. A liquid sealant composition which is relatively stable under room temperature conditions in isolation from contact with metal surfaces and comprising a room-temperature-reactive acrylic ester monomer selected from the class consisting of di-, tri- and tetraesters of an acrylic acid and a polyhydric alcohol, acrylic esters of cyclic ether alcohols, acrylic esters of amino alcohols and mixtures thereof, a peroxidic initiator in an amount sufficient to initiate polymerization of said monomer at room temperature and a compound selected from the class consisting of rhodanine and a hydrazide having the formula:

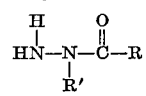

whrein R and R' are selected from separate groups and an interconnected group forming a cyclic ring, R is further selected from the class consisting of H, alkyl, cycloalkyl, aryl and alkoxy and R' is selected from the class consisting of hydrogen, alkyl, cycloalkyl, acyl and dithiocarbonyl, in an amount sufficient to accelerate the polymerization of said monomer at room temperature on confinement of said sealant between closely facing metal surfaces without adversely affecting storage stability.

2. A shelf stable liquid sealant composition which can be stored at room temperature when isolated from contact with metal surfaces for an extended period of time, having the composition of claim 1 wherein the hydrazide compound is selected from the class consisting of ethyl carbazate, t-butyl carbazate and N-aminorhodanine.

3. The composition of claim 1 containing a small amount of an organic imide, said small amount being sufficient to enhance the bond strength of the set composition within about 24 hours of room temperature cure, said organic imide including in its structure at least one group selected from the class consisting of:

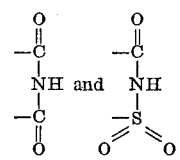

4. The composition of claim 3 wherein said organic imide is benzoic sulfimide.

5. The composition of claim 3 wherein said organic imide is phthalimide.

6. The composition of claim 1 wherein said compound is present in an amount of from 0.001 to 5 weight percent based on said monomer.

7. The composition of claim 1 wherein said peroxidic initiator is di-t-butyl diperphthalate.

8. The composition of claim 1 wherein said peroxidic initiator is t-butyl hydroperoxide.

9. The composition of claim 1 wherein said peroxidic initiator is t-butyl peroxymaleic acid.

10. The composition of claim 1 wherein said peroxidic initiator is bis (1-hydroxycyclohexyl) peroxide.

11. The composition of claim 1 wherein said peroxidic initiator is cumene hydroperoxide.

12. The composition of claim 1 wherein said monomer is polyethyleneglycol dimethacrylate.

13. The composition of claim 1 wherein said monomer is tetrahydrofurfuryl methacrylate.

14. A laminate structure comprising separate members having closely facing ferrous metal surfaces and a layer of the composition of claim 1 set between said surfaces and securing said members as a unit.

15. A method of adhering closely facing metal surfaces, which method comprises interposing between said surfaces the liquid composition of claim 1 and permitting said surfaces to stand at ambient conditions until said composition is set.

16. The liquid sealant composition of claim 1 including p-methoxy phenol as polymerization inhibitor.

17. The liquid sealant composition of claim 16 including ethoxyethoxyethoxypropylamine as co-accelerator.

18. The liquid sealant composition of claim 16 including phthalimide as co-accelerator.

19. The liquid sealant composition of claim 1 including ethoxyethoxyethoxypropylamine as co-accelerator.

20. The liquid sealant composition of claim 1 wherein said compound selected from said class is t-butyl carbazate.

21. The liquid sealant composition of claim 20 wherein said peroxidic initiator is t-butyl hydroperoxide.

22. The liquid sealant composition of claim 20 containing p-methoxy phenol as polymerization inhibitor.

23. The liquid sealant composition of claim 20 including ethoxyethoxyethoxypropylamine as co-accelerator.

24. The liquid sealant composition of claim 20 including phthalimide as co-accelerator.

References Cited

UNITED STATES PATENTS

| | | | |
|---|---|---|---|
| 2,268,611 | 1/1942 | Mitchell | 260—86.1 |
| 2,464,826 | 3/1949 | Neher et al. | 260—86.1 |
| 3,218,305 | 11/1965 | Krieble | 260—89.5 |
| 3,234,194 | 2/1966 | Slocum | 260—89.5 |
| 3,249,656 | 5/1966 | Kalinowski | 260—88.5 |
| 3,265,768 | 8/1966 | Mottus et al. | 260—86.1 |
| 3,370,051 | 2/1968 | Sullivan et al. | 260—86.1 |
| 2,895,950 | 7/1959 | Krieble | 260—89.5 |
| 2,901,099 | 8/1959 | Krieble | 260—89.5 |
| 3,041,322 | 6/1962 | Krieble | 260—89.5 |
| 3,043,820 | 7/1962 | Krieble | 260—89.5 |
| 3,046,262 | 7/1962 | Krieble | 260—89.5 |
| 3,203,941 | 8/1965 | Krieble | 260—89.5 |
| 3,300,547 | 1/1967 | Gorman | 260—89.5 |

HARRY WONG, JR., Primary Examiner

U.S. Cl. X.R.

117—132; 260—78.5, 31.8, 33.2, 86.1, 89.5, 901